United States Patent [19]

Garin

[11] Patent Number: 4,693,666
[45] Date of Patent: Sep. 15, 1987

[54] SCARA TYPE MANIPULATOR APPARATUS

[75] Inventor: John Garin, Mt. Lebanon, Pa.

[73] Assignee: Westinghouse Electric Corp., Pittsburgh, Pa.

[21] Appl. No.: 892,890

[22] Filed: Jul. 31, 1986

Related U.S. Application Data

[63] Continuation of Ser. No. 635,375, Jul. 27, 1984, abandoned.

[51] Int. Cl.$^4$ ............................................... B25J 9/06
[52] U.S. Cl. ................................ 414/744 R; 474/118; 474/137; 901/21
[58] Field of Search ........... 414/744 R, 744 A, 744 B, 414/744 C, 7; 901/14, 15, 21; 474/113, 118, 121, 133, 134, 136, 137

[56] References Cited

U.S. PATENT DOCUMENTS

| | | | |
|---|---|---|---|
| 2,012,399 | 8/1935 | Molinelli | 474/137 |
| 2,624,205 | 1/1953 | Ellstrom | 474/13 X |
| 3,060,760 | 10/1962 | Minnis | 474/137 |
| 3,496,918 | 2/1970 | Finlay | 474/137 X |
| 3,575,058 | 4/1971 | Kraus | 474/134 X |
| 4,128,952 | 12/1978 | Duke | 474/134 X |
| 4,392,776 | 7/1983 | Shum | 414/744 R |
| 4,416,647 | 11/1983 | White, Jr. | 474/137 X |

FOREIGN PATENT DOCUMENTS 1043391  9/1983  U.S.S.R. .............................. 474/137

Primary Examiner—Robert J. Spar
Assistant Examiner—Donald W. Underwood
Attorney, Agent, or Firm—Michael P. Lynch; Thomas R. Trempus

[57] ABSTRACT

A SCARA type robotic manipulator apparatus including a base supporting first and second independently operable drive motors, toothed belts engaging toothed gears for rotating primary and secondary arms in response to the first and second drive motors respectively, and adjustable bidirectional belt tensioning assemblies associated with the belts to preload the belts to provide stable, repeatable operation of the robot arms.

2 Claims, 6 Drawing Figures

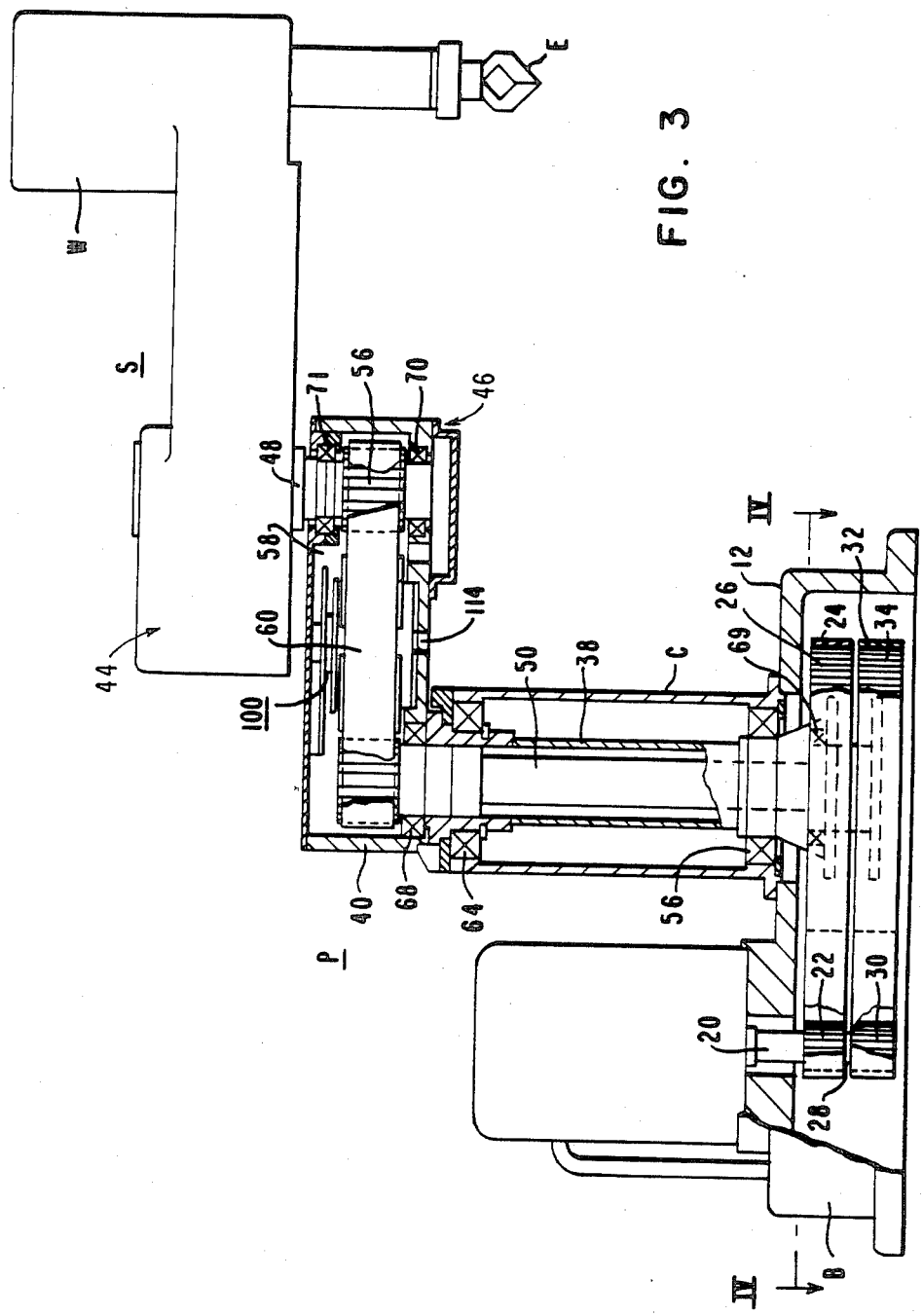

SCARA TYPE MANIPULATOR APPARATUS

This application is a continuation of application Ser. No. 06/635,375 filed July 27, 1984, abandoned.

BACKGROUND OF THE INVENTION

The SCARA (Selective Compliance Assembly Robot Arm) type manipulator apparatus refers to an assembly robot having two jointed links pivoting about parallel vertical axes. An embodiment of the SCARA type manipulator apparatus is illustrated and described in detail in U.S. Pat. No. 4,392,776, entitled "Robotic Manipulator Structure" which is assigned to the Westinghouse Electric Corporation. The assignee of the present invention is a wholly owned subsidiary of the Westinghouse Electric Corporation. A novel embodiment disclosed in the above-referenced U.S. patent employs a chain drive system to effect movement of the articulated arms in the XY plane. While the chain drive system represents a workable implementation of the novel manipulator apparatus, practical limitations in the chain drive system adversely affect its utilization as a commercial product. The deficiencies of the chain drive system are primarily due to stretching of the chain over a period of time coupled with the lack of adequate tensioning of the chain with respect to the drive sprockets. The stretching of the chain results in mechanical instability which is exhibited when the direction of motion of the robot arms is changed.

SUMMARY OF THE INVENTION

There is described herein with reference to the accompanying drawing an improved drive system for the novel manipulator apparatus disclosed in the above-identified U.S. patent. The mechanical chain is replaced by a toothed belt and a bidirectional tensioning arrangement which provides uniform spring rate regardless of the change in direction of the movement of the robot arms.

BRIEF DESCRIPTION OF THE DRAWINGS

The invention will become more readily apparent from the following exemplary description in connection with the accompanying drawings:

FIG. 3 is a sectioned illustration of the side elevation of FIG. 1;

DESCRIPTION OF THE PREFERRED EMBODIMENT

Figure 2:
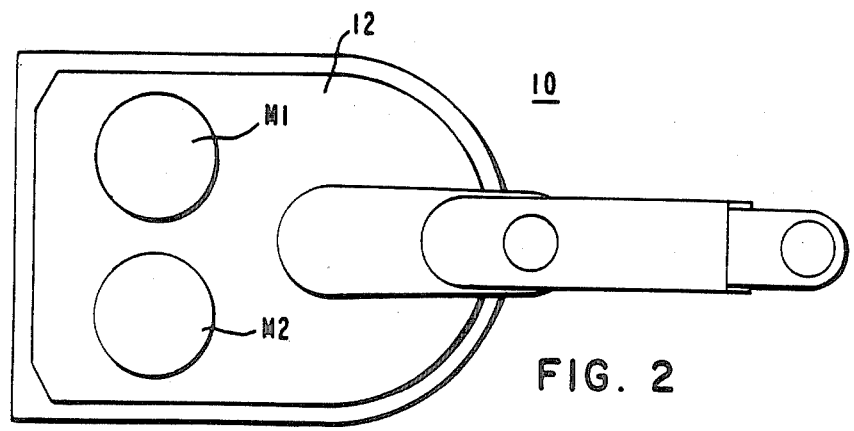
FIG. 2 is a top view of the side elevation of FIG. 1.
Figure 1:
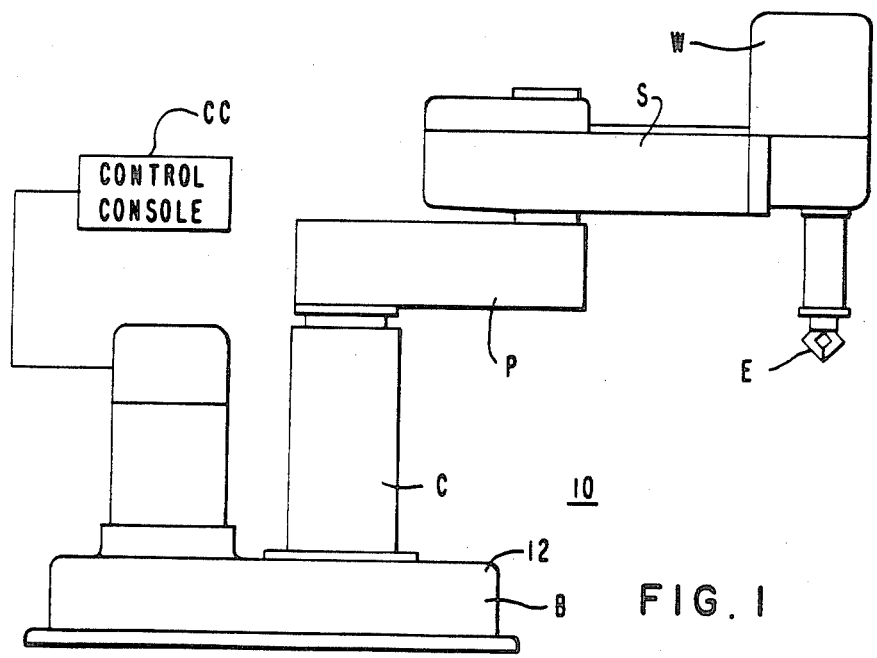
FIG. 1 is a side elevation of a SCARA type robot embodying the invention.

Referring to FIGS. 1 and 2, there is illustrated a SCARA type robot 10 comprising a base assembly B including drive motors M1 and M2, a vertical column C supporting a primary arm assembly P, and a secondary arm assembly S. A modular wrist W in combination with an end effector E is affixed to the secondary arm assembly S. The operation of the robot 10 is controlled from the control console CC. The rotational motion of the primary arm assembly P is controlled by drive motor M1 and a drive arrangement coupling the motor M1 through the base assembly B and the column C. Drive motor M2 controls the rotational motion of the secondary arm assembly S through a drive system extending from the base assembly B through column C and the primary arm assembly P.

Figure 4:
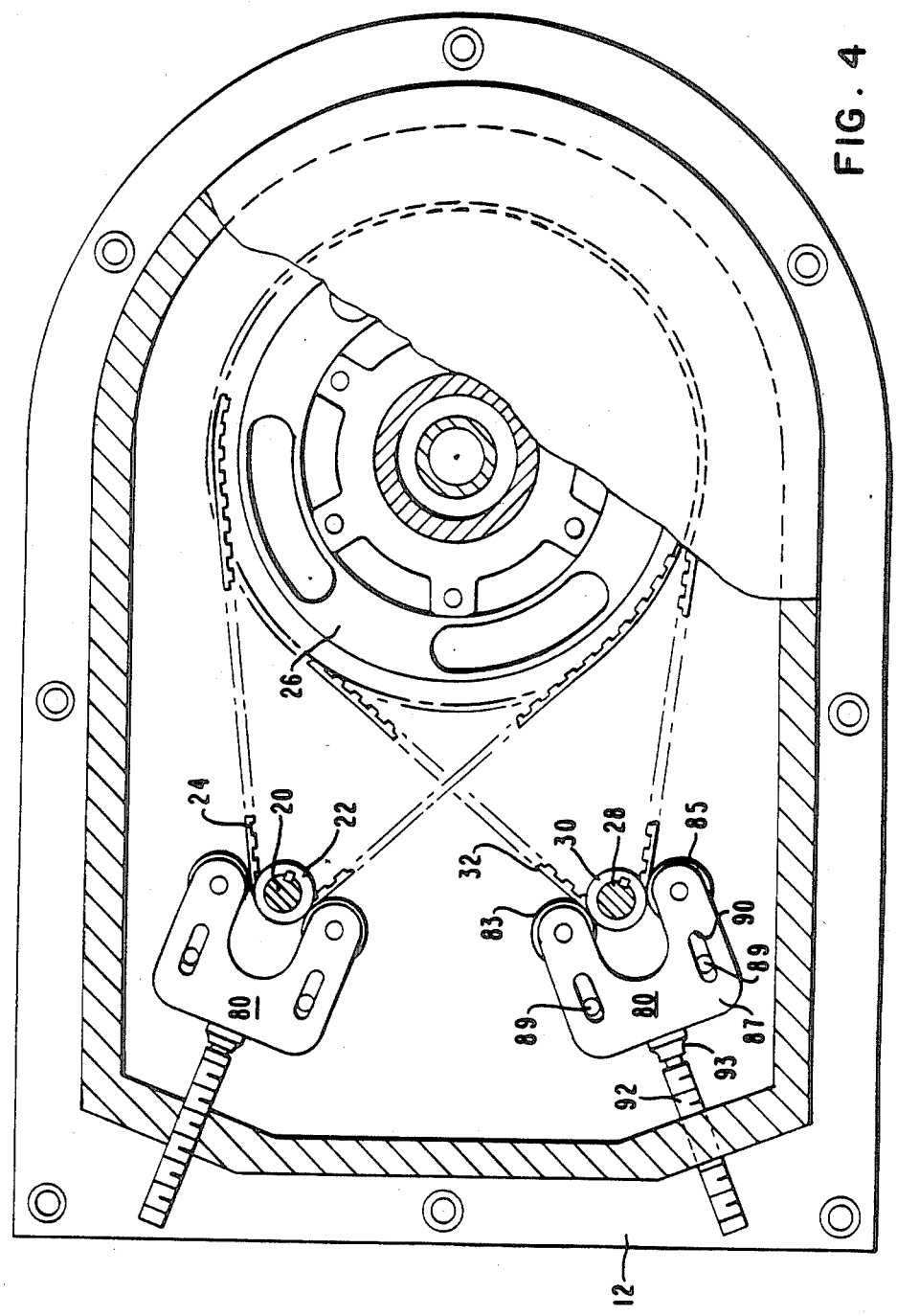
FIG. 4 is a sectioned illustration along the line A—A of FIG. 1.

Independently operable primary and secondary arm drive assemblies employing novel belt and bidirectional tensioning arrangements in combination with the drive motors M1 and M2 are illustrated in the sectioned views of FIGS. 3 and 4.

The independently operable drive motors M1 and M2 are affixed to the base plate 12 of the base drive assembly B. The drive shaft 20 for the first drive motor M1 projects through the plate 12 and is provided with a small toothed gear, or sprocket, 22 which is adapted through an endless toothed belt 24 to drive the large toothed gear, or sprocket, 26. In a similar arrangement for the drive motor M2, the drive shaft 28 carries toothed gear 30 to drive the endless toothed belt 32 and thus the other large toothed gear 34.

The primary arm assembly P is rotatably supported by the column C for horizontal rotation through a first horizontal planar space. The primary arm assembly P is generally hollow and is carried at its proximate end by the hollow shaft 38 which is extended a right angle relative to the length of the first arm and is supported from the column C. The upper end of the shaft 38 is fixed to the proximate end 40 of the primary arm assembly P while the lower end of shaft 38 is affixed to the gear 26.

The secondary arm assembly S has its proximate end 44 rotatably supported at the distal end portion 46 of the primary arm assembly P through a hollow shaft 48. The modular wrist W and associated end effector E are secured to the opposite end of the secondary arm assembly S.

The lower end of shaft 48 has driven means fixed thereto in the form of the toothed gear 56 which is in alignment with the hollow interior portion 58 of the primary arm assembly P. The secondary arm assembly S is rotatable through a horizontal plane by rotation of the toothed gear 56 coupled through an endless toothed belt 60 to toothed gear 62 fixed to the upper end of the second shaft 50. The lower end of the second shaft 50 is affixed to the large toothed gear 34, driven from the drive motor M2. The combination of the toothed gears 56 and 62, and the endless belt 60 forms a secondary arm coupling arrangement.

Each of the three hollow shafts 38, 48 and 50 are rotatably supported from their respective supporting structures by angular contact bearings. Angular contact bearings 64 and 56 function to support the first shaft 38 from the base assembly B. The angular contact bearings 68 and 69 support the second hollow shaft 50. The set of bearings 70 and 71, located at the distal end portion of the primary arm assembly P, support the third shaft 48.

The toothed belts 24, 32 and 60 are industrial quality belts consisting of elastomer rubber and a steel cable core designed to match the spring stiffness of the belts to the spring stiffness of the mechanical assembly of the robot 10. As a matter of robot design consideration the stiffness of the belt is generally equal to or greater than the calculated stiffness of the arm so that the belt selection does not detract from the accuracy or repeatability of the arm.

Referring to FIG. 4, bidirectional belt tensioning devices 80 are adjustably positioned relative to the toothed gears 22 and 30 of the drive motors M1 and M2 respectively to assure proper tensioning of the belts 24 and 32. The belt tensioning devices 80 include rotatable rollers 83 and 85 secured within a U-shaped element 87 which is slideably attached to the base plate 12 via fasteners 89 which extend through the assembly slots 90. The positioning of the rollers 83 and 85 with respect to the belt and toothed gear combinations 22/24 and 30/32 is provided by a screw type positioner 92 which is threaded through the housing of the base assembly B. The positioner 92 includes a swivel foot 93 affixed to the device 80. The positioning of the rollers 83 and 85 with respect to the belt/toothed gear combinations provides not only bidirectional tensioning of the belts 24 and 32 but also serves to control the angle of engagement of the belts 24 and 32 relative to the toothed gears 22 and 30, respectively. The latter adjustment feature determines the level of surface contact between the belt and the toothed gears affixed to the drive shafts of the drive motors. Once the proper tensioning has been established through the positioning of the devices 80 by the screw type positioners 92, the devices 80 are secured in place by the fasteners 89. The proper positioning of the devices 80 is predetermined by dynamic analysis which establishes the required torque to achieve a preload in the belts 24 and 32 which will provide the required stability of the primary and secondary arm assemblies of the robot 10. The improved robot arm stability realized by the bidirectional belt tensioning devices 80 results in desired robot repeatability for a given payload supported by the end effector E.

The drive motors M1 and M2 are selected such that the rotor inertia times the gear ratio between the small and large toothed gears is approximately equal to the dynamic inertia of the robot arm assemblies moving at maximum speed. Once again as a matter of robot design consideration the motors are generally selected such that the inertia of the motors is the dominant inertia in robot assembly. This criteria in selecting the drive motors provides robot arm assembly stability during acceleration, deceleration and stopping.

The steel core elastomer belts also contribute to operational stability and reliability to the extent that such belts do not require lubrication, and exhibit limited mechanical stretching and wear. The material for the toothed gears is selected to exhibit the desired wear characteristics to provide robot stability and repeatability consistent with the belts. Aluminum gears have proven to be particularly reliable.

Figure 5:
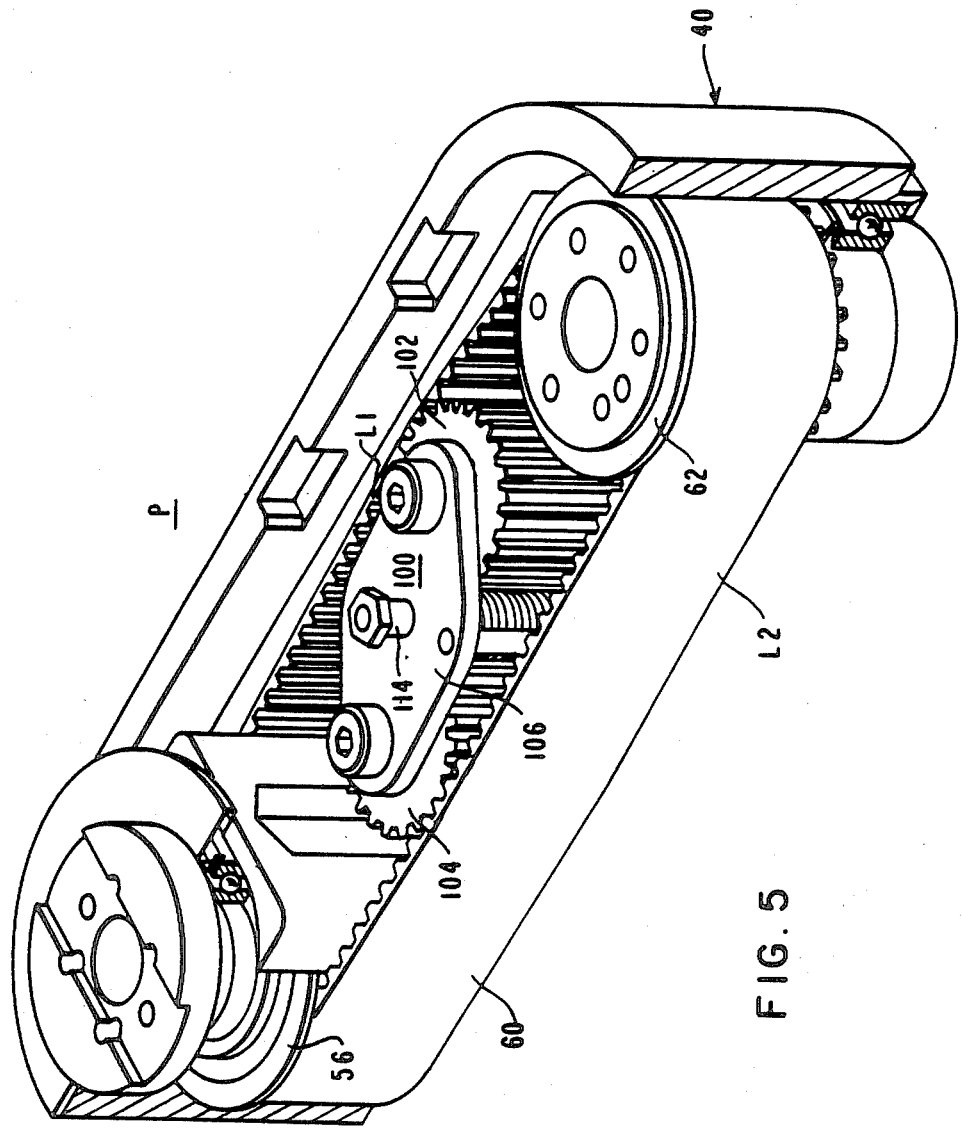
FIG. 5 is a sectioned pictorial illustration of the primary arm of the embodiment of FIG. 1.
Figure 6:
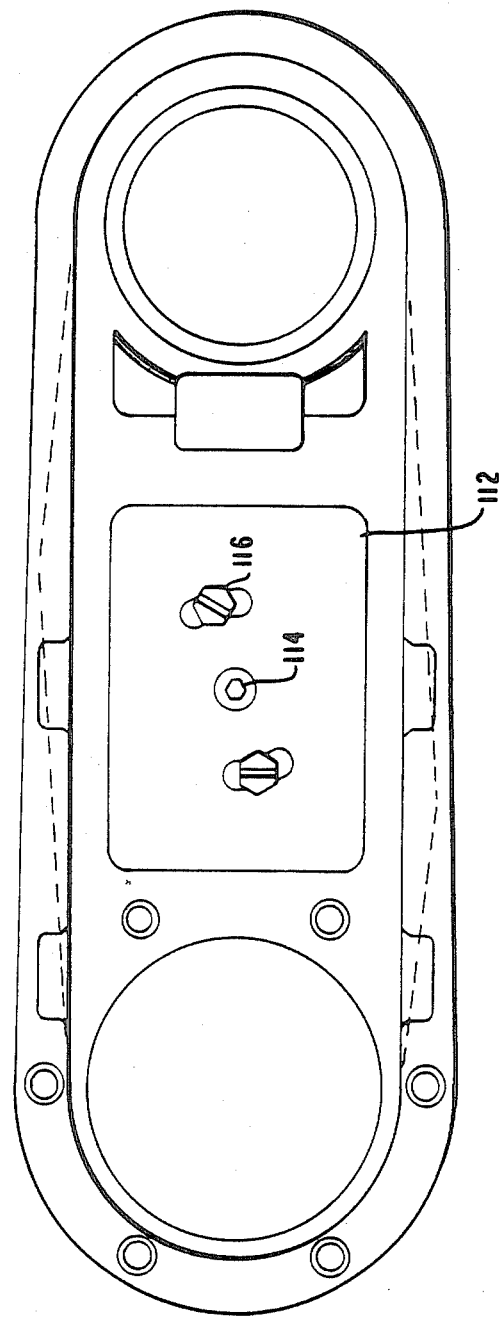
FIG. 6 is a top view of the primary arm of FIG. 5.

The bidirectional tensioning for the belt 60 of the secondary arm coupling arrangement positioned within the primary arm assembly P, as shown in FIGS. 5 and 6, is achieved by the bidirectional belt tensioning and idler device 100 positioned within the belt loop and intermediate the toothed gears 56 and 62. The device 100 includes rotatable toothed rollers, or pulleys, 102 and 104 for internal engagement with opposite lengths L1 and L2 of the belt 60 which are moving in opposite directions. The rollers 102 and 104 are connected by a yoke 106 which connects the supporting axes of the rollers. The device 100 is rotated about a torquing arrangement 110 which extends through a mounting plate 112. The torquing arrangement 110 includes an adjustable tensioning element 114 for rotating the 100 relative to the belt 60 to establish the desired tensioning of the belt 60. Once the proper tensioning is established, the device 100 is secured by the fasteners 116. The desired belt tension corresponds to a predetermined torque associated with the tensioning element 114 and thus the belt 60 can be pretensioned via the tensioning device 114 without requiring visual access to the interior of the primary arm assembly P.

I claim:

1. In a drive system having a first toothed gear, a second toothed gear and an endless toothed belt means operatively coupling the toothed gears for rotation in response to a drive motor means, the combination of a bidirectional belt tensioning means, comprising, a U-shaped support member having first and second rotatable roller means affixed at either end of said U-shaped supported member, said U-shaped support member being slidably positioned relative to said first toothed gear such that said first toothed gear is located within the open end of said U-shaped support member, said first and second rotatable roller means contacting the external surface of said endless toothed belt means on either side of said first toothed gear, wherein both said first and second rotatable roller means contacting the external surface of said endless tooth belt means exert simultaneously increasing or decreasing tension on said belt means, and adjustment means coupled to said U-shaped support member to position said U-shaped member relative to said first toothed gear for simultaneously positioning said first and second rotatable roller means to control the tension of said endless toothed belt means.

2. A robotic manipulator apparatus comprising:
a base supporting first and second independently operable drive means;
a primary arm rotatably supported by said base and means coupling said primary arm to said first drive means for driving said primary arm from said first drive means for rotation through one planar space;
a secondary arm having one end rotatably carried by the end of said primary arm opposite said base for rotation through another planar space, translationally displaced from said first planar space;
means coupling said second drive means to drive said secondary arm independently of said primary arm, said coupling means extending from said base through said first arm to said one end of said secondary arm;
each of said first and second independently operable drive means including a drive motor means having a first toothed gear affixed to the drive shaft, each of said means for coupling including a second toothed gear, a first endless toothed belt means operatively coupling the toothed gears for rotating said primary arm in response to the drive motor means of said first operable drive means, a second endless toothed belt means operatively coupling the toothed gears for rotating said secondary arm in response to the drive motor means of said second operable means, and
first and second adjustably positioned bidirectional belt tensioning means operatively associated with said first and second toothed belt means to control the tension of each of said belts,
each of said adjustably positioned bidirectional belt tensioning means including;
a U-shaped support member having first and second rotatable roller means affixed at either end of said U-shaped support member, said U-shaped support member being slidably positioned relative to said first toothed gear such that said first toothed gear is located within the open end of said U-shaped support member, said first and second rotatable roller means contacting the external surface of said endless toothed belt means on either side of said first tooth gear, wherein both said first and second rotatable roller means contacting the external surface of said endless tooth belt means exert simultaneously increasing or decreasing tension on said belt means, and adjustment means coupled to said U-shaped support member to position said U-shaped support member relative to said first toothed gear for simultaneously positioning said first and second rotatable roller means to control the tension of said endless tooth belt means.

* * * * *